(12) United States Patent
Cruz et al.

(10) Patent No.: US 9,813,511 B2
(45) Date of Patent: Nov. 7, 2017

(54) ROAMING INSTANT MESSAGING

(75) Inventors: Christina M. Cruz, Mableton, GA (US); Charles B. Price, Jr., Decatur, GA (US); Van Staub, Smyrna, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 572 days.

(21) Appl. No.: 11/964,653

(22) Filed: Dec. 26, 2007

(65) Prior Publication Data
US 2009/0172105 A1    Jul. 2, 2009

(51) Int. Cl.
| | |
|---|---|
| G06F 15/16 | (2006.01) |
| H04L 29/08 | (2006.01) |
| H04L 12/58 | (2006.01) |
| H04W 4/02 | (2009.01) |
| H04W 4/18 | (2009.01) |

(52) U.S. Cl.
CPC ............ *H04L 67/18* (2013.01); *H04L 51/043* (2013.01); *H04L 67/1095* (2013.01); *H04W 4/02* (2013.01); *H04W 4/028* (2013.01); *H04W 4/18* (2013.01); *H04L 67/36* (2013.01)

(58) Field of Classification Search
CPC . H04L 67/18; H04L 51/1043; H04L 67/1095; H04L 67/36
USPC ......................................................... 709/206
See application file for complete search history.

(56) References Cited

U.S. PATENT DOCUMENTS

| | | |
|---|---|---|
| 6,912,398 B1 | 6/2005 | Domnitz |
| 7,123,706 B2 | 10/2006 | Ooki |
| 7,190,956 B2 | 3/2007 | Dorenbosch et al. |
| 2002/0173308 A1 | 11/2002 | Dorenbosch et al. |
| 2003/0078979 A1 | 4/2003 | Sagi |
| 2004/0203895 A1 | 10/2004 | Balasuriya |
| 2005/0015483 A1 | 1/2005 | Carter et al. |
| 2005/0054290 A1 | 3/2005 | Logan et al. |
| 2005/0105734 A1 | 5/2005 | Buer et al. |
| 2005/0147133 A1 | 7/2005 | Tang et al. |
| 2005/0242167 A1 | 11/2005 | Kaario et al. |
| 2005/0259612 A1 | 11/2005 | Yarlagadda |
| 2005/0285739 A1 | 12/2005 | Velhal et al. |
| 2006/0009155 A1 | 1/2006 | Paalasmaa et al. |
| 2006/0031367 A1 | 2/2006 | Buford et al. |
| 2006/0044153 A1 | 3/2006 | Dawidowsky |
| 2006/0047761 A1 | 3/2006 | Kaplan et al. |

(Continued)

OTHER PUBLICATIONS

Klaseen et al., "The Definition of Interoperability Architectures for Intelligent Devices Using Abstract Models", pp. 237-245.

*Primary Examiner* — Alan S Chou
(74) *Attorney, Agent, or Firm* — Cuenot, Forsythe & Kim, LLC

(57) ABSTRACT

A computer-implemented method of instant messaging can include determining location information for at least one user of an instant messaging system, determining when the user is no longer proximate to a home instant messaging client, and determining when the user is proximate to a guest instant messaging client. The computer-implemented method also can include dynamically updating a status of the user within an instant messaging system according to the proximity of the user to at least one of the home instant messaging client or the guest instant messaging client.

15 Claims, 3 Drawing Sheets

(56) References Cited

U.S. PATENT DOCUMENTS

| | | |
|---|---|---|
| 2006/0174010 A1 | 8/2006 | Deshpande |
| 2006/0256959 A1 | 11/2006 | Hymes |
| 2007/0043820 A1 | 2/2007 | George et al. |
| 2007/0260730 A1* | 11/2007 | Gadwale ............ H04L 12/5815 709/224 |
| 2007/0270159 A1* | 11/2007 | Lohtia ................. H04L 12/189 455/456.1 |
| 2008/0091692 A1* | 4/2008 | Keith ................. G06F 17/3089 |
| 2008/0096517 A1 | 4/2008 | Appleyard et al. |
| 2008/0217551 A1* | 9/2008 | Zhang ....................... G01T 7/00 250/390.03 |
| 2008/0299948 A1* | 12/2008 | Rosener ..................... 455/412.2 |
| 2009/0066510 A1* | 3/2009 | Kamdar et al. ............ 340/572.1 |

* cited by examiner

ROAMING INSTANT MESSAGING

FIELD OF THE INVENTION

The embodiments of the present invention relate to instant messaging and, more particularly, to a method and system for instant messaging when roaming.

BACKGROUND OF THE INVENTION

Instant messaging (IM) refers to a form of electronic communication that allows a plurality of users to communicate with one another in real time. While originally limited to the real time exchange of text messages, IM has expanded to encompass real time voice, video, and the exchange of digital files. Each user that will be communicating via IM must have presence. That is, each user must have a network connection and, via his or her IM client, be logged onto an IM server. Generally, the IM server is responsible for establishing IM sessions between IM clients and facilitating the exchange of IM communications among the IM clients of a particular IM session.

IM has become an important means of communication within organizations of all types. It is not uncommon for users engaged in an IM session to multitask. At times, a participant in an IM session may have a pressing need to leave his or her IM client. If that participant does not notify other participants of his or her absence from the IM client, e.g., explicitly or through a change of status, the other participants have no way of knowing that the participant is no longer available.

BRIEF SUMMARY OF THE INVENTION

The embodiments disclosed herein relate to instant messaging. One embodiment of the present invention can include a computer-implemented method of roaming instant messaging (IM). The method can include identifying a first IM session between a first participant and a second participant, determining that the first participant is not proximate to a home IM client associated with the first participant, outputting a notification that the first participant is no longer proximate to the home instant messaging client and determining that the first participant is proximate to a guest IM client associated with another IM user for a predetermined period of time. The computer-implemented method can include outputting a notification that the first participant is proximate to the guest IM client.

Another embodiment of the present invention can include a computer-implemented method of roaming IM including determining location information for at least one user of an IM system and determining when the user is proximate to an IM client for a predetermined period of time. The computer-implemented method also can include dynamically updating a status of the user within an IM system according to the proximity of the user to the IM client.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
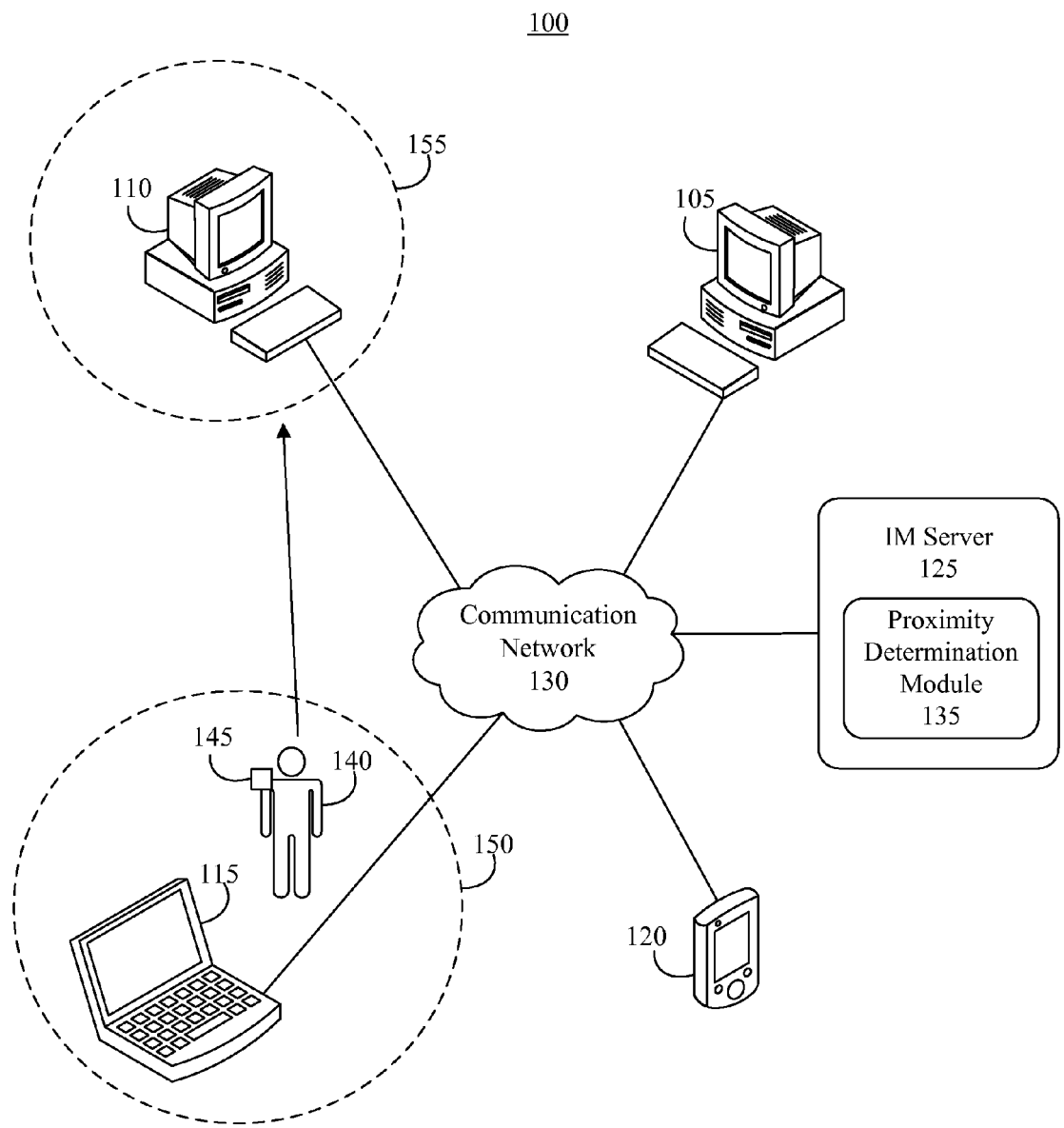
FIG. 1 is a block diagram illustrating a system for roaming instant messaging (IM) in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device). A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to instant messaging (IM). In accordance with the embodiments disclosed herein, location information for a plurality of users can be determined and updated. When a particular user physically moves away from an IM client through which the user has logged onto an IM server, e.g., a home IM client, that condition can be detected. A notification can be issued indicating that the user is no longer proximate to his or her home IM client. The notification can be provided to other IM users, including participants of an IM session within which the now roaming user may be involved.

When the roaming user comes into proximity of another IM client, that condition can be detected. A notification that the mobile user is proximate to another IM client through which another user, e.g., not the roaming user, has logged onto the IM server, referred to as a guest IM client, can be output. This allows a user of the IM system to be notified when another participant leaves his or her home IM client and begins roaming. IM users also can be notified when the roaming user is proximate to a guest IM client. Accordingly, an IM user can initiate an IM session to the guest IM client to which the roaming user is proximate to facilitate further communication with the roaming user.

FIG. 1 is a block diagram illustrating a system 100 for roaming IM in accordance with one embodiment of the present invention. The system 100 can be dispersed throughout a geographic area, e.g., throughout a plurality of buildings, different floors of buildings, etc. The system 100 can include a plurality of IM clients 105, 110, 115, 120, an IM server 125, and a communication network 130. Each of the IM clients 105-120, as well as the IM server 125, can be communicatively linked via the communication network 130. Further, each of the IM clients 105-120 can be remotely located from one another, e.g., whether in different rooms, 10-20 feet from one another, or within different buildings.

The communication network 130 can facilitate communications, e.g., IM communications, between and among the various IM clients 105-120 in cooperation with the IM server 125. The communication network 130 can be implemented as, or include, without limitation, a WAN, a LAN, the Public Switched Telephone Network (PSTN), the Web, the Internet, and one or more intranets. The communication network 130 further can be implemented as or include one or more wireless networks, whether short or long range, or mobile.

The IM clients 105-120 can be implemented as any of a variety of different types of data processing systems including a suitable IM client application that, when executed, causes each data processing system to perform IM client functions as described herein. Examples of data processing systems capable of executing IM client applications can include, but are not limited to, desktop computer systems, laptop computer systems, personal digital assistants, or any other information appliance capable of communicating over communication network 130, whether via a wired or wireless communication link.

The IM server 125 can be implemented as a data processing system, e.g., a server, that can include and execute an IM server application. Accordingly, the IM server 125 can perform functions such as determining presence of registered users on the communication network 130, establishing IM sessions and terminating IM sessions between users, facilitating IM sessions by routing IM communications among the various IM clients of users, and the like. The IM server 125 further can maintain status information for each registered user in conjunction with, or independently of, the presence information for each user.

As shown, the IM server 125 further can include and execute a proximity determination module 135. The proximity determination module 135 can determine location information for users of the IM system, maintain such information, update that information over time, determine the IM clients, if any, to which a user is proximate. It should be appreciated that while the proximity determination module 135 is depicted as being within the IM server 125, in another embodiment, the proximity determination module 135 can be included and executed within another data processing system communicatively linked with the IM server 125.

In any case, the IM server application and the proximity determination module 135 can communicate with one another so that status information relating to users registered with the IM server can be updated according to information determined and maintained within the proximity determination module 135. That is, the IM server 125 can indicate whether a user is physically away from his or her own IM client, near another IM client, etc., based upon information obtained from the proximity determination module 135.

The proximity determination module 135 can monitor the location of users registered with the IM server 125. For example, a user such as user 140 can be equipped with, or carry on his or her person, some sort of proximity device 145. The proximity device 145 may be any of a variety of different location detection mechanisms utilizing any of a variety of different technologies. The location of the proximity device 145 can be assumed to be the same as the location of the user 140. That is, the location of the proximity device 145 can be a proxy for the location of the user 140. The proximity determination module can maintain a registry that associates proximity devices with users registered with the IM server 125.

In one embodiment, the proximity device 145 can be a global positioning system (GPS) transmitter that determines and transmits the location of the user 140. In that case, the proximity device 145 can transmit location information for the user 140 via a wireless communication link to the proximity detection module 135, from time to time, periodically, etc. The IM server 125 can include proximity detection devices, e.g., a peripheral coupled to the IM server 125, which can detect GPS transmitters and receive location information from such devices.

In another embodiment, the proximity device 145 can be a radio frequency identifier (RFID) tag. In that case, the RFID tag can be sensed or detected by one or more RFID readers (not shown) that can be dispersed throughout the IM system. Each IM client 105-120, for example, can be coupled to, or include, an RFID reader peripheral that can detect or otherwise determine when an RFID tag is proximate to the IM client to which the RFID reader is communicatively linked. The RFID reader can output a signal indicating which RFID tag has been detected. The RFID read can transmit such information to the proximity detection module 135 independently or working in conjunction with suitable software executing in the IM clients 105-120.

The locations of the various IM clients 105-120 can be determined in any of a variety of different ways. In one embodiment, the location of each IM client 105-120 can be preprogrammed within the proximity detection module 135. In another embodiment, one or more of the IM clients 105-120 can be coupled to a GPS transmitter. In that case, each IM client having such a transmitter can transmit its location to the proximity detection module 135. In yet another embodiment, as noted, the IM clients 105-120 can be coupled to RFID readers that, responsive to detecting an RFID tag within a predetermined range, output a signal that can be transmitted or sent to the proximity detection module 135.

It should be appreciated that the various devices and technologies for determining location information are used for purposes of illustration only. Those skilled in the art will appreciate that any of a variety of different location detection and/or proximity detection systems and/or techniques may be used, e.g., triangulation using RF devices and signals.

Accordingly, the embodiments disclosed herein are not intended to be limited solely to the examples provided.

In operation, a user 140 can be logged into IM client 115. In this example, IM client 115 can be the home IM client of user 140. As used herein, the phrase "home IM client" of a selected user can refer to the IM client, e.g., the data processing device executing an IM client application, through which the selected user establishes presence with the IM server 125 or through which the selected user logs onto the IM server 125. Thus, the "home IM client" of a selected user is associated with an address for the selected user within IM server 125. IM client 115, being the home IM client for user 140, can be associated with an address for user 140 within IM server 125. Accordingly, IM communications sent to user 140 are routed to IM client 115.

The proximity determination module 135 can determine that the user is located within a predetermined distance of IM client 115 as indicated by region 150. For example, if IM client 115 is equipped with an RFID reader and proximity device 145 is an RFID tag, the predetermined distance can be defined as the natural range of the RFID reader in terms of detecting RFID tags. Hence, when the IM client 115 senses the RFID tag associated with user 140, the proximity detection module can determine that the user 140 is, in fact, physically located at IM client 115.

It should be appreciated that when the RFID reader is capable of detecting varying signal strengths, the region 150, e.g., the predetermined distance, can be adjusted. Signal strength thresholds can be set and used to evaluate and/or compare signal strength of detected RFID tags. By increasing the threshold, the region 150 can be decreased in size. That is, an RFID tag will not be considered proximate to the RFID reader unless a signal strength exceeding the threshold is detected.

In the case where GPS is used, the proximity determination module 135 can compare the location of the proximity device 145 with the location of the IM client 115 and calculate a distance between the two. If the 140 is within a predetermined distance of IM client 115, e.g., within region 150, the user 140 can be identified or determined to be proximate to IM client 115.

As the user 140 moves beyond region 150, the proximity determination module 135 can detect the occurrence of that condition and provide an output. As used herein, the term "output" and/or "outputting" can mean, for example, writing to a file, storing in memory, writing to a user display or other output device, playing audible notifications, sending or transmitting to another system, exporting, or the like.

As the user 140 enters region 155 representing a range defined by a predetermined distance surrounding IM client 110, the proximity determination module 135 can detect the occurrence of that condition as well. Each of the regions 150 and 155 surrounding an IM client can be defined according to the location of the IM client. That is, a region can be defined in terms of extending outward in varying directions and for varying distances, all predetermined, from the IM client.

The proximity determination module 135 can output a notification indicating that the user 140 is proximate to IM client 110. The IM client 110 can be referred to as the "guest IM client." A "guest IM client" refers to an IM client that is not associated with the address of user 140, e.g., the roaming user. A "guest IM client", for example, may be associated with an address in the IM server that belongs to, or has been associated with, a user other than the user that is roaming. Alternatively, a "guest IM client" may not be associated with any user. For example, no user may be logged into a guest IM client such as IM client 110. For purposes if illustration, in this case it can be assumed that another user, not user 140, is logged into the IM server 125 via IM client 110. In any case, with respect to user 140, IM client 110 is a guest IM client.

It should be appreciated that the regions 150 and 155, which represent predetermined distances surrounding each IM client, need not be uniform in nature. That is, while illustrated as being circular in shape, the shape can be any of a variety of shapes. In the case of some technologies, e.g., RFID, the shape of the region may be determined by the sensitivity of the RFID reader. In other cases, where actual locations are determined rather than sensing proximity, each region may be programmed to any desired shape.

For example, if an IM client is placed next to a wall, the region surrounding the IM client may be programmed to extend only a foot, for example, toward the wall, while extending several feet away from the wall. This can prevent the proximity determination module 135 from determining that a user is proximate to an IM client due to a small distance being calculated between the user and the IM client when, in fact, a physical barrier such as a wall stands between the two. It further should be appreciated that each region for each IM client can be a different shape than the others. Moreover, a mix of proximity determination technologies may be used, e.g., a blend of RFID and GPS, such that different IM clients can be equipped with different sorts of proximity detection equipment.

It should be appreciated that the examples described herein have been provided for purposes of illustration and are not intended to limit the present invention. For example, in another embodiment, a roaming user need not be logged onto any IM client. If the roaming user is registered with the system described in FIG. 1, location information for that user may be determined. Proximity of the roaming user to various guest IM clients can be determined regardless of whether the roaming user is logged into any IM client.

Figure 2:
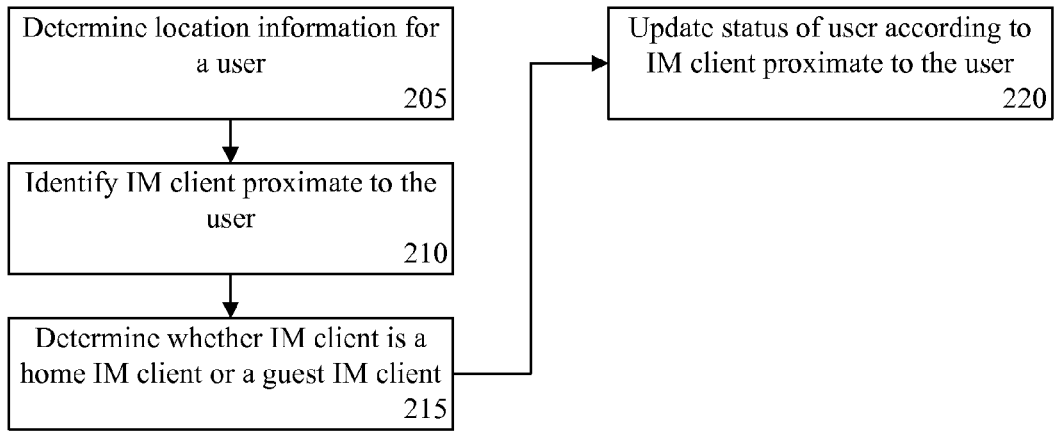
FIG. 2 is a flow chart illustrating a method of roaming IM in accordance with another embodiment of the present invention.

FIG. 2 is a flow chart illustrating a method 200 of implementing roaming IM in accordance with another embodiment of the present invention. The method 200 can be implemented using a system as described with reference to FIG. 1 or any other system with the same or similar functionality. While FIG. 2 is illustrated with respect to a single user, it should be appreciated that the methodology disclosed can be applied or repeated, as the case may be, to determine location information for a plurality of users.

Accordingly, in step 205, the system can determine location information for a user. In step 210, the system can identify one or more IM clients that are proximate to the IM user. In cases where RFID tags or other proximity detection mechanisms are used, it should be appreciated that steps 205 and 210 may be performed as a single step. For example, such is the case when an IM client having an RFID reader detects an RFID tag of a user near or proximate to the IM client.

In cases where the user is proximate to more than one IM client, the IM client that is closest to the user can be selected or identified. Alternatively, if the user is proximate to two or more IM clients and one of the IM clients is the home IM client of the user, the home IM client can be selected or identified as being proximate to the user. It should be appreciated that in some cases, the user may not be proximate to any IM client. Accordingly, the system can determine that no IM client is proximate to the user.

In step 215, the system can determine whether the IM client proximate to the user is the home IM client of the user or is a guest IM client. In step 220, the system can update the status of the user. For example, the location of the user as being proximate to his or her home IM client or a guest IM client can be updated in the IM server. In cases where the status indicates that the user is proximate to a guest IM client, the identity of the other user that is logged into the guest IM client can be indicated in the status of the user.

Figure 3:
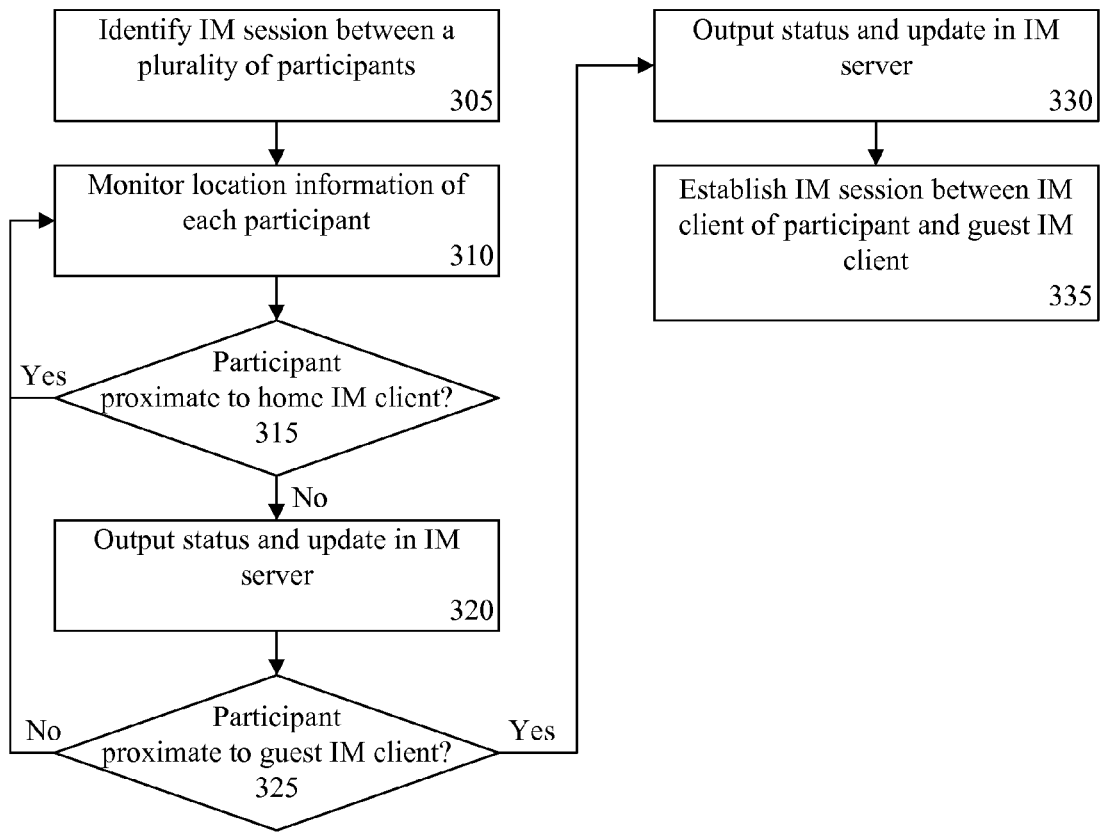
FIG. 3 is a flow chart illustrating a method of roaming IM in accordance with another embodiment of the present invention.

FIG. 3 is a flow chart illustrating a method 300 of implementing roaming IM in accordance with another embodiment of the present invention. The method 300 can be implemented using a system as described with reference to FIG. 1 or any other system with the same or similar functionality. It should be appreciated that while FIG. 3 is illustrated with respect an established IM session, the various steps in terms of monitoring user location and outputting notifications can be implemented regardless of whether the users are participants in an active IM session.

Accordingly, in step 305, the system can identify a first IM session between a plurality of participants, e.g., users involved in the identified IM session. For purposes of illustration, it can be assumed that each participant is proximate to, and working through, his or her own home IM client. In step 310, the system can monitor location information for each of the participants in the IM session.

For example, location information can be determined by the proximity detection module and communicated to the IM server application as user status information. For purposes of illustration, the remainder of method 300 will be described with reference to a selected, or first, participant that moves away from his or her home IM client during the IM session. The first participant (or user) may also be referred to as a roaming user. As previously noted, it should be appreciated that the method 300 can be implemented to function with respect to a plurality of users.

In step 315, the system can determine whether the first participant is proximate to his or her home IM client. If the first participant is proximate to his or her home IM client, the method can loop back to step 310 to continue monitoring location information for the first participant. If not, the method can proceed to step 320 where status of the first participant can be output and updated in the IM server. For example, a notification can be output as will be described herein in greater detail.

In step 325, the system can determine whether the first participant is proximate to a guest IM client. If the first participant is proximate to a guest IM client, the method can proceed to step 330. If not, the method can loop back to step 310 to continue monitoring location information for the first participant.

In another embodiment, in determining whether the first participant is proximate to a guest IM client, a time requirement can be imposed. That is, in order to be considered proximate to the guest IM client, the first participant may need to be within the region surrounding the guest IM client, or within a predetermined distance of the guest IM client, for a minimum amount of time, e.g., 5 seconds, 10 seconds, 30 seconds, one minute, etc. Imposition of the time requirement can reduce the likelihood that a user will be considered proximate to a guest IM client when merely passing by that guest IM client, e.g., not stopping or lingering in the vicinity of the guest IM client.

In step 330, a status of the first participant can be output and/or updated in the IM server. As noted, the status can indicate whether the first participant is proximate to his or her home IM client or a guest IM client. If the first participant is proximate to a guest IM client, the status can indicate the particular guest IM client to which the first participant is proximate.

In step 335, a second IM session can be established between an IM client of one of the participants of the IM session identified in step 305, e.g., a second participant, and the guest IM client proximate to the first participant. In one embodiment, when, or after, establishing the second IM session, a notification can be sent from the IM client of the second participant to the guest IM client at which the first participant is located indicating that the second participant wishes to communicate with the first participant.

It should be appreciated that in order to determine whether a roaming user is proximate to a guest IM client, another user does not have to be logged into the guest IM client. That is, location information can be determined for the roaming user regardless of whether anyone is logged into guest IM clients. In such cases, rather than indicating the identity of a user that is logged into the guest IM client when providing location information for the roaming user, a location of the guest IM client proximate to the user can be provide or another designation, e.g., second floor, office 203, the name of a user that typically logs into the guest IM client or that is associated with the computing device that is proximate to the roaming user. The initiation of a second IM session to the guest IM client, however, would require that a user be logged into the guest IM client that is proximate to the roaming user.

Figure 4A:
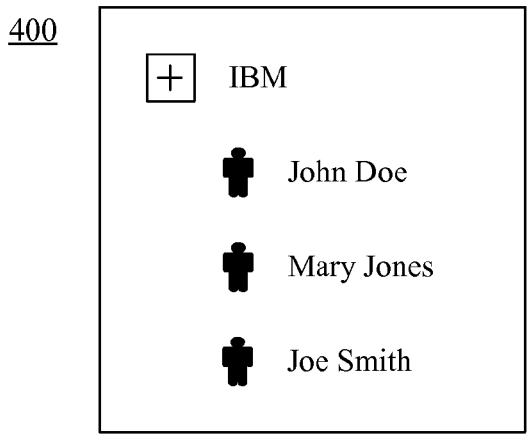
FIGS. 4A-4C, taken collectively, illustrate a graphical user interface that can be used with an IM client in accordance with another embodiment of the present invention.
Figure 4B:
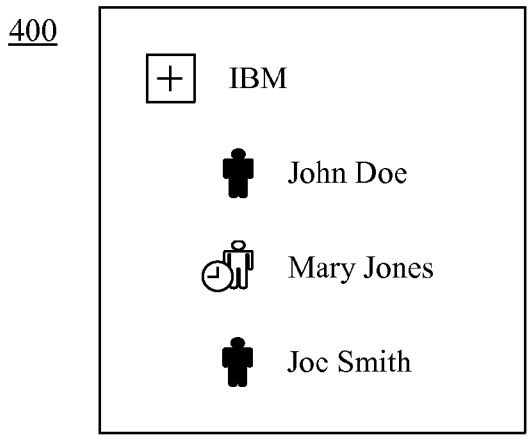
Figure 4C:
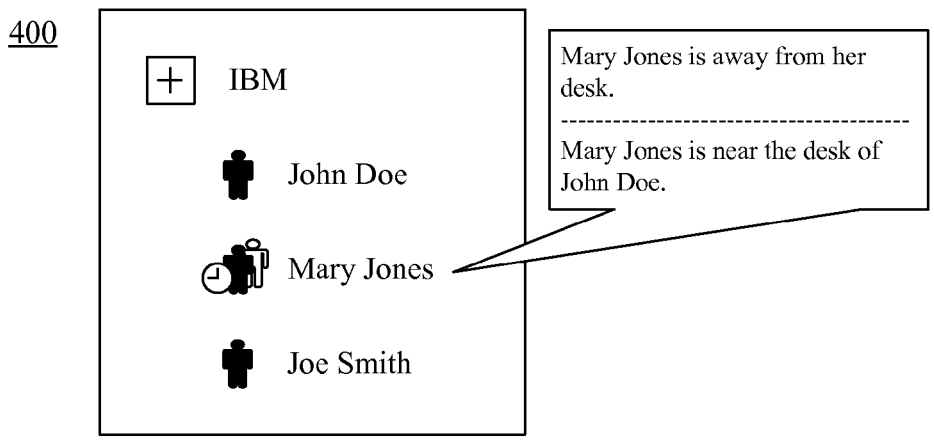

FIG. 4A-4C, taken collectively, illustrate a graphical user interface that can be used with an IM client in accordance with another embodiment of the present invention. More particularly, FIGS. 4A-4C illustrate a list of IM users 400 at various times during the course of an IM session. The list 400 can be an example of a "buddy list" presented within an IM client or an IM user directory. The list 400 can be generated by an IM client utilizing status information obtained from the IM server as described herein.

In FIG. 4A, for purposes of illustration, it can be assumed that the users shown in the list 400, e.g., John Doe, Mary Jones, and Joe Smith, are engaged in an IM session with one another. Each user is located at his or her home IM client. Accordingly, the icon associated with the name of each user indicates a status of "present," "at desk," or "located at home IM client."

FIG. 4B illustrates the case where the system has determined that Mary Jones is no longer proximate to her home IM client. For example, Mary Jones has moved beyond a predetermined distance from, or out of the predetermined region surrounding, her home IM client. Accordingly, the icon associated with Mary Jones has been dynamically updated to indicate an "away" status, or a status of "not located at home IM client."

FIG. 4C illustrates the case where the system has determined that Mary Jones is proximate to a guest IM client. Accordingly, the icon associated with Mary Jones can be dynamically updated to indicate that status, e.g., of being proximate to the IM client of another. In this example, responsive to receiving notification of the status of Mary Jones, a user viewing the list 400, e.g., John Doe, Joe Smith, or even another user, can provide a user input requesting further information. For example, a pop-style window 405 can be presented responsive to detecting a "flyover" type of pointer motion or movement over the icon associated with Mary Jones. The window 405 can provide more detailed information in terms of the particular guest IM client to which Mary Jones is now proximate. In this example, Mary Jones has been determined to be proximate to the IM client of John Doe.

Accordingly, one wishing to communicate with Mary Jones via IM can initiate an IM session with John Doe. Once the IM session is established with John Doe, the user that initiated the session can indicate that he or she wishes to communicate with Mary Jones. The embodiments disclosed herein allow a user to leave his or her home IM client and move to another location. Other users may view the particular guest IM client to which the user is proximate and initiate an IM session to that guest IM client. This allows users to effectively continue IM sessions that may be have been interrupted or initiate an entirely new IM session to communicate with the roaming user.

In one embodiment, a user having been in an IM session with a now roaming user may be automatically presented with an option via the user's IM client to continue the IM session with the roaming user at a guest IM client. In that case, an IM session can be automatically established with between the IM client of the user wishing to continue the IM session and the guest IM client. In establishing the IM session, the IM server can provide a notification of the circumstances to the guest IM client. For example, upon initiating the IM session, the guest IM client can provide one or more visual and/or audible indicators that the IM session being established or requested is for another user.

It should be appreciated that the various examples and illustrations provided herein have been used for purposes of illustration only and, as such, are not intended to limit the embodiments of the present invention. For example, the various interfaces shown may be implemented in any of a variety of different ways using any of a variety of different visual controls so as to convey status information and provide notifications of user status as described herein. User inputs may be provided in various forms apart from the examples provided.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method comprising:
    identifying a first instant messaging session between a first participant and a second participant;
    determining that the first participant is not proximate to a home instant messaging client associated with the first participant;
    outputting a notification that the first participant is no longer proximate to the home instant messaging client;
    determining, using a processor, that the first participant is proximate to a guest instant messaging client associated with another instant messaging user when the first participant is within a region surrounding the guest instant messaging client for a minimum amount of time, wherein the guest instant messaging client is not associated with an address of the first participant and the guest instant messaging client executes an instant messaging client application, wherein the region surrounding the guest instant messaging client is predetermined to have a non-circular shape extending outward from the guest instant messaging client for each of a plurality of distances in respective directions, wherein a first of the plurality of distances in a direction toward a physical barrier is less than a second of the plurality of distances in a direction away from the physical barrier;
    outputting a notification that the first participant is proximate to the guest instant messaging client;
    receiving a request from the second participant to establish an instant messaging session with the instant messaging client application executed by the guest instant messaging client;
    indicating that the requested instant messaging session is for the first participant; and
    establishing a second instant messaging session between an instant messaging client of the second participant and the instant messaging client application executed by the guest instant messaging client.

2. The method of claim 1, wherein:
    the shape of the region surrounding the guest instant messaging client is determined by a sensitivity of a proximity detector coupled to the guest instant messaging client; and
    the proximity detector determines whether the first participant is within the region surrounding the guest instant messaging client.

3. The method of claim 1, wherein:
    the shape of the region surrounding the guest instant messaging client is determined setting at least one signal strength threshold of a proximity detector coupled to the guest instant messaging client; and
    the proximity detector determines whether the first participant is within the region surrounding the guest instant messaging client.

4. The method of claim 3, wherein the proximity detector is a radio frequency identifier (RFID) reader.

5. The method of claim 1, further comprising:
    determining a location of the first participant via a global positioning system (GPS) system; and
    determining whether the first participant is proximate to the home instant messaging client by comparing the location of the first participant as determined by the GPS system to the predetermined region surrounding the instant messaging client.

6. A system, comprising:
    a memory configured to store instructions;
    a processor coupled to the memory, wherein the processor, in response to executing the instructions, is configured to initiate executable operations comprising:
    identifying a first instant messaging session between a first participant and a second participant;
    determining that the first participant is not proximate to a home instant messaging client associated with the first participant;
    outputting a notification that the first participant is no longer proximate to the home instant messaging client;
    determining that the first participant is proximate to a guest instant messaging client associated with another instant messaging user when the first participant is within a region surrounding the guest instant messaging client for a minimum amount of time, wherein the guest instant messaging client is not associated with an address of the first participant and the guest instant messaging client executes an instant messaging client application, wherein the region surrounding the guest instant messaging client is predetermined to have a non-circular shape extending outward from the guest instant messaging client for each of a plurality of distances in respective directions, wherein a first of the plurality of distances in a direction toward a physical barrier is less than a second of the plurality of distances in a direction away from the physical barrier;
    outputting a notification that the first participant is proximate to the guest instant messaging client;
    receiving a request from the second participant to establish an instant messaging session with the instant messaging client application executed by the guest instant messaging client;
    indicating that the requested instant messaging session is for the first participant; and
    establishing a second instant messaging session between an instant messaging client of the second participant and the instant messaging client application executed by the guest instant messaging client.

7. The system of claim 6, wherein:
    the shape of the region surrounding the guest instant messaging client is determined by a sensitivity of a proximity detector coupled to the guest instant messaging client; and
    the proximity detector determines whether the first participant is within the region surrounding the guest instant messaging client.

8. The system of claim 6, wherein:
    the shape of the region surrounding the guest instant messaging client is determined setting at least one signal strength threshold of a proximity detector coupled to the guest instant messaging client; and the proximity detector determines whether the first participant is within the region surrounding the guest instant messaging client.

9. The system of claim 8, wherein the proximity detector is a radio frequency identifier (RFID) reader.

10. The system of claim 6, the executable operations further comprising:

determining a location of the first participant via a global positioning system (GPS) system; and determining whether the first participant is proximate to the home instant messaging client by comparing the location of the first participant as determined by the GPS system to the predetermined region surrounding the instant messaging client.

11. A computer program product comprising a computer readable device having program code stored thereon, the program code executable by a processor to perform a method comprising:

identifying, by the processor, a first instant messaging session between a first participant and a second participant;

determining, by the processor, that the first participant is not proximate to a home instant messaging client associated with the first participant;

outputting, by the processor, a notification that the first participant is no longer proximate to the home instant messaging client;

determining, by the processor, that the first participant is proximate to a guest instant messaging client associated with another instant messaging user when the first participant is within a region surrounding the guest instant messaging client for a minimum amount of time, wherein the guest instant messaging client is not associated with an address of the first participant and the guest instant messaging client executes an instant messaging client application, wherein the region surrounding the guest instant messaging client is predetermined to have a non-circular shape extending outward from the guest instant messaging client for each of a plurality of distances in respective directions, wherein a first of the plurality of distances in a direction toward a physical barrier is less than a second of the plurality of distances in a direction away from the physical barrier;

outputting, by the processor, a notification that the first participant is proximate to the guest instant messaging client;

receiving, by the processor, a request from the second participant to establish an instant messaging session with the instant messaging client application executed by the guest instant messaging client;

indicating, by the processor, that the requested instant messaging session is for the first participant; and establishing, by the processor, a second instant messaging session between an instant messaging client of the second participant and the instant messaging client application executed by the guest instant messaging client.

12. The computer program product of claim 11, wherein:

the shape of the region surrounding the guest instant messaging client is determined by a sensitivity of a proximity detector coupled to the guest instant messaging client; and the proximity detector determines whether the first participant is within the region surrounding the guest instant messaging client.

13. The computer program product of claim 11, wherein:

the shape of the region surrounding the guest instant messaging client is determined setting at least one signal strength threshold of a proximity detector coupled to the guest instant messaging client; and the proximity detector determines whether the first participant is within the region surrounding the guest instant messaging client.

14. The computer program product of claim 13, wherein the proximity detector is a radio frequency identifier (RFID) reader.

15. The computer program product of claim 11, the executable operations further comprising:

determining a location of the first participant via a global positioning system (GPS) system; and determining whether the first participant is proximate to the home instant messaging client by comparing the location of the first participant as determined by the GPS system to the predetermined region surrounding the instant messaging client.

* * * * *